United States Patent Office 3,429,862
Patented Feb. 25, 1969

3,429,862
PROCESS AND CATALYSTS FOR PRODUCTION OF OLEFIN POLYMERS
Lawrence M. Fodor, Bartlesville, Okla., assignor to Phillips Petroleum Company, a corporation of Delaware
No Drawing. Filed Mar. 7, 1966, Ser. No. 532,127
U.S. Cl. 260—93.7        9 Claims
Int. Cl. C08f 1/42, 1/44; B01j 11/84

ABSTRACT OF THE DISCLOSURE

Solid polymers of 1-olefins having high modulus and low xylenes-soluble content are produced by polymerization of said olefin in the presence of a catalyst formed by addition of compounds of the formula $PX_3$ and $X_2$ to a mixture of compounds of the formula $R_nAlX_{3-n}$ and $TiCl_3 \cdot \frac{1}{3} AlCl_3$. In the foregoing formulas X is a halogen; n is 1, 2 or 3; and R is selected from the group consisting of hydrogen, alkyl, aryl and cycloalkyl radicals having 1 to 20 carbon atoms.

---

This invention relates to the polymerization of olefins to form solid polymers. In one aspect it relates to an improved catalyst for the polymerization of olefins. In another aspect it relates to a process for producing polymers of olefins having high modulus and low xylenes-soluble content.

It is known in the art to polymerize aliphatic 1-olefins such as propylene and 1-butene to form crystalline solid polymers. Catalysts for such a process are often formed by mixing together a compound having a metal-carbon bond with a compound of a transition metal. The activities of various of these catalysts can be improved by the addition of other compounds. Thus, for example, a catalyst which forms on the admixing of an alkylaluminum halide with a titanium halide can be improved by the addition to this mixture of a third component such as an organic phosphine. Still other components can be added to increase activity. Catalysts and processes of this type are disclosed in U.S. Patents 2,832,759 (1958) and 3,051,692 (1962). It is also known to produce crystalline polypropylene in high yields by the use of a catalyst which forms on mixing a dialkylaluminum chloride or iodide with a complex which forms on the reaction of titanium tetrachloride with metallic aluminum. This type catalyst and process are disclosed in British Patent 940,178.

Catalysts of the organometal type vary widely in activity and in the properties of the polymers which they produce. In the production of crystalline polypropylene, it is desirable to obtain not only high yields in the polymerization process but also a polymer which has a high flexural modulus.

An object of this invention is to provide an improved catalyst. Another object of this invention is to provide polyolefins having relatively high flexural modulus. Another object of this invention is to provide polyolefins having very low xylenes-soluble content. A further object of this invention is to produce a polymer with a very low amount of noncrystalline polymer, i.e., xylene-solubles material.

Other objects, aspects and the several advantages will become apparent to those skilled in the art upon considering this disclosure.

In accordance with this invention, I have discovered that by adding both compounds of the formula $PX_3$ and $X_2$ to the catalyst system consisting of a mixture of compounds of the formula $R_nAlX_{3-n}$ and $TiCl_3 \cdot \frac{1}{3} AlCl_3$ there is obtained surprisingly high modulus and lower xylenes-soluble content when compared with either $PX_3$ or $X_2$ alone added to the catalyst system.

In the foregoing formula R is selected from the group consisting of hydrogen, alkyl, aryl, and cycloalkyl radicals and combinations thereof having 1 to 20 carbon atoms, more preferably 1 to 10 carbon atoms, X is a halogen, preferably chlorine, bromine or iodine, n is 1, 2 or 3.

The enumeration of alkyl, cycloalkyl and aryl radicals herein in defining the formulae is intended to include the various mixed radicals such as alkaryl, aralkyl and the like.

In forming the foregoing catalyst, the molar ratio of the compound $R_nAlX_{3-n}$ to compound $TiCl_3 \cdot \frac{1}{3} AlCl_3$ is in the range 0.5:1 to 10:1, preferably 1:1 to 7.5:1. The molar ratio of $PX_3$ to $TiCl_3 \cdot \frac{1}{3} AlCl_3$ is in the range of 0.01:1 to 7.5:1 preferably 0.05:1 to 5:1. The molar ratio of $X_2$ to $TiCl_3 \cdot \frac{1}{3} AlCl_3$ is in the range of 0.01:1 to 7.5:1, preferably 0.05:1 to 5:1. The stated ranges are those which provide the most satisfactory results; however, ratios outside these ranges can be used.

The total catalyst concentration is usually within the range of 0.005 to 10 weight percent of the olefin being polmerized, but concentrations outside this range are operative. In forming the catalyst of this invention, it is preferred to premix the aluminum compound, phosphorus halide and halogen and thereafter add the mixture to the titanium complex.

The organometal compounds ($R_nAlX_{3-n}$) used in accordance with this invention are well known in the art. They include methyl aluminum dichloride, diethylaluminum chloride, methylethylaluminum bromide, ethylaluminum sesquichloride, isobutyloctylaluminum iodide, diisopropylaluminum fluoride, cyclohexylaluminum dibromide, cyclopentylphenylaluminum chloride, 2 - methylcyclopentylbenzylaluminum iodide, ditetradecylaluminum chloride, triethylaluminum, tri-n-butylaluminum, eicosylaluminum diiodide, 2-cyclohexyl-ethylaluminum dibromide, di(3-phenyl-1-methylpropyl)aluminum fluoride, 2-(3-isopropylcyclohexyl)ethylaluminum dichloride, aluminum hydride, chloroethylaluminum hydride, diethylaluminum hydride, ethylaluminum dichloride, triisobutylaluminum, and the like. Mixtures can be employed.

The titanium trichloride complex represented by the formula $TiCl_3 \cdot \frac{1}{3} AlCl_3$ is well known to the industry, and is usually prepared by reduction of $TiCl_4$ with aluminum.

Any of the phosphorus halides can be used, such as phosphorus trichloride, phosphorus tribromide, phosphorus triiodide, or phosphorus trifluoride.

The olefins which are polymerizable in accordance with this invention are aliphatic 1-olefins having up to 8 carbon atoms per molecule, e.g., ethylene, propylene, 1-butene, 1-pentene, 1-hexene, 1-heptene, 4-methyl-1-pentene and 1-octene. The greatest benefits are obtained in the polymerization of aliphatic 1-olefins having 3 to 7 carbon atoms.

The polymerization reaction is carried out in liquid olefin or in an inert liquid hydrocarbon diluent such as a paraffin, cycloparaffin, or aromatic hydrocarbon having up to 20 carbon atoms per molecule. Examples of hydrocarbons that can be used are pentane, hexane, heptane, isooctane, eicosane, cyclohexane, methylcyclopentane, benzene, toluene, naphthalene, anthracene, and the like. When a solvent is used, the volume ratio of solvent to 1-olefin is in the range of 1:1 to 10:1 preferably 3:1 to 7:1.

The polymerization is most frequently conducted in the temperature range 80° to 250° F., and more frequently 100° to 200° F. The pressure used can be sufficient to maintain the reaction mixture substantially in the liquid phase, or—particularly in a mass system—can be such that the olefin is in the gas phase. While an inert hydrocarbon diluent, e.g., a paraffin, cycloparaffin, or aromatic hydrocarbon having up to 20 carbon atoms per molecule, can be utilized, it is frequently advantageous to conduct the reaction without a diluent, especially when propylene is being polymerized. Under these circumstances, propylene acts as the reaction medium. The reaction time is generally in the range 10 minutes to 50 hours, more frequently 30 minutes to 25 hours.

It is frequently desirable, for controlling the molecular weight of the polymer, to utilize hydrogen in a concentration of about 0.08 to about 1 mol percent of 1-olefin in the system. When propylene is being polymerized in a mass polymerization system, it is desirable to mix the hydrogen with the propylene before passing the propylene into the polymerization reactor.

The product polymers in accordance with this invention can be recovered from the reaction mixture by processes well known in the prior art. Thus the product polymer can be contacted with a chelating compound such as a diketone to remove catalyst residues and further contacted with a hydrocarbon such as n-pentane or liquid propylene to remove remaining traces of catalyst and chelating agent as well as any small amount of polymer fraction which may be soluble in light hydrocarbons at temperatures of the order of 80° to 100° F.

In the commercial production of polypropylene, it is desirable that the production of noncrystalline polymer, as measured by xylene-soluble content, be maintained at a low level. One advantage of this invention is that product polymer contains only small amounts of xylene-soluble material. The percentage xylene-soluble material is determined by placing 0.95 gram of polymer in a 100-ml. centrifuge tube, adding 95 ml. of xylene, heating 15 minutes at 285° F., cooling, centrifuging, evaporating the solvent from a 25-ml. aliquot of the supernatant liquid, weighing the residue, and multiplying by 400.

The following example will serve to illustrate the invention, although it is not intended that the invention be limited thereto.

EXAMPLE I

In a series of runs illustrating specific embodiment of this invention, propylene was polymerized in a one-liter, stirred reactor in 2.5 hour runs at 130° F. and 325 p.s.i.g. with 250 grams of propylene and 1-liter of hydrogen (equivalent to 0.69 mol percent hydrogen on the propylene) present in the reaction system. The aluminum compound, phosphorus halide, and halogen were premixed and then added to the titanium complex in all of the runs.

The following results were obtained:

TABLE 1

| Run No. | Mol Ratio [1] $R_nAlX_{3-n}:PX_3:X_2:TiCl\cdot\frac{1}{3}AlCl_3$ | Catalyst, Wt. percent [2] | Flexural Modulus [3] p.s.i.$\times 10^{-3}$ | Xylenes Soluble, Wt. Percent |
|---|---|---|---|---|
| 1[4] | 4:0:0:1 | 0.26 | 49 | 31.2 |
| 2 | 4:1:0:1 | 0.32 | 100 | 15.7 |
| 3 | 4:0:1:1 | 0.36 | 43 | 35.7 |
| 4 | 4:1:1:1 | 0.42 | 261 | 1.4 |
| 5 | 3:1:0.25:1 | 0.30 | 256 | 2.4 |
| 6 | 4:1:0:1 | 0.37 | 107 | 18.3 |
| 7 | 4:1:1:1 | 0.47 | 305 | 2.1 |

[1] $R_nAlX_{3-n}$ is triethylaluminum in all runs. $PX_3$ is phosphorus trichloride in Runs 1–5 and is phosphorus tribromide in Runs 6 and 7. $X_2$ is iodine in all runs.
[2] Based on propylene.
[3] ASTM D 790-61.
[4] Run length was 1.8 hours.

The above data show that an unexpected increase in modulus and decrease in xylenes-soluble content is obtained when the combination of $PX_3$ and $X_2$ is added to the mixture of Al and Ti compounds as compared with the use of either $PX_3$ or $X_2$ alone with the Al and Ti compounds.

EXAMPLE II

A series of runs further illustrating the invention was obtained by polymerizing about 50 ml. (25 grams) of propylene dissolved in 250 ml. (158 grams) of pentane in 19 to 69 hour runs at 122° F. and about 65 p.s.i.g. with 0.35 to 0.38 mol percent added hydrogen, on the basis of the propylene. The aluminum compound, phosphorus halide, and halogen were premixed and then added to the titanium complex in all of the runs.

The following results were obtained:

TABLE 2

| Run No. | Mol Ratio [1] $R_nAlX_{3-n}:PX_3:X_2:TiCl\cdot\frac{1}{3}AlCl_3$ | Catalyst, Wt. percent [2] | Flexural Modulus [3] p.s.i.$\times 10^{-3}$ | Xylenes Soluble, Wt. Percent |
|---|---|---|---|---|
| 1 | 3:0:0:1 | 1.13 | 87 | 25. |
| 2 | 3:1:0:1 | 1.40 | 258 | 2.1 |
| 3 | 3:0:1:1 | 1.70 | 69 | 28.8 |
| 4 | 3:1:1:1 | 1.90 | 292 | 0.3 |
| 5 | 4:0:0:1 | 1.37 | 84 | 25.1 |
| 6 | 4:1:0:1 | 1.70 | 224 | 3.8 |
| 7 | 4:0:1:1 | 1.89 | 81 | 24.0 |
| 8 | 4:1:1:1 | 2.20 | 305 | 1.0 |
| 9 | 3:1:0.5:1 | 1.60 | 302 | 1.4 |
| 10 | 3:1:1:1 | 2.20 | 296 | 1.2 |

[1] $R_nAlX_{3-n}$ is triethylaluminum in all runs. $PX_3$ is phosphorus trichloride in Runs 1–9 and is phosphorus tribromide in Run 10. $X_2$ is iodine in Runs 1–8 and 10, and is bromine in Run 9.
[2] Based on propylene.
[3] ASTM D 790-61.

The above data show that an unexpected increase in modulus and decrease in xylenes-soluble content is obtained when the combination of $PX_3$ and $X_2$ is added to the mixture of Al and Ti compounds as compared with the use of either $PX_3$ or $X_2$ alone with the Al and Ti compounds.

Reasonable variations and modifications can be made or followed, in view of the foregoing, without departing from the spirit and scope of this invention.

I claim:

1. A catalyst composition formed on admixing (a) a compound of the formula $R_nAlX_{3-n}$ wherein R is hydrogen or alkyl, cycloalkyl, aryl having 1 to 20 carbon atoms; (b) a compound of the formula $TiCl_3 \cdot \frac{1}{3}AlCl_3$; (c) a compound of the formula $PX_3$; (d) a compound of the formula $X_2$; and wherein X is a halogen and n is 1, 2 or 3 and wherein the molar ratio of the compound of the formula $R_nAlX_{3-n}$ to the compound of the formula $TiCl_3 \cdot \frac{1}{3}AlCl_3$ is in the range of 0.5:1 to 10:1, the molar ratio of the compound of the formula $PX_3$ to the compound of the formula TiCl$_3$·⅓AlCl$_3$ is in the range of 0.01:1 to 7.5:1 and the molar ratio of the compound of the formula X$_2$ to the compound of the formula $$TiCl_3 \cdot \tfrac{1}{3}AlCl_3$$

is in the range of 0.01:1 to 7.5:1.

2. A catalyst according to claim 1 formed on admixing triethyl-aluminum, TiCl$_3$·⅓AlCl$_3$, phosphorus trichloride and iodine.

3. A catalyst according to claim 1 formed on admixing triethyl-aluminum, TiCl$_3$·⅓AlCl$_3$, phosphorus tribromide and iodine.

4. A catalyst according to claim 1 formed on admixing triethyl-aluminum, TiCl$_3$·⅓AlCl$_3$, phosphorus trichloride and bromine.

5. A catalyst according to claim 1 wherein the molar ratio of the compound R$_n$AlX$_{3-n}$ to TiCl$_3$·⅓AlCl$_3$ is in the range of 1:1 to 7.5:1 and the molar ratios of PX$_3$ and X$_2$ to TiCl$_3$·⅓AlCl$_3$ are in the range of 0.05:1 to 5:1.

6. A process for the polymerization of 1-olefins to form solid polymers thereof having high modulus and low xylenes-soluble content which comprises polymerizing an aliphatic 1-olefin having up to 8 carbon atoms per molecule in the presence of a catalyst which forms on mixing (a) a compound of the formula R$_n$AlX$_{3-n}$; (b) a titanium trichloride-aluminum trichloride complex having the formula TiCl$_3$·⅓AlCl$_3$; (c) a compound of the formula PX$_3$; (d) a compound of the formula X$_2$, wherein X is a halogen, R is hydrogen or alkyl, cycloalkyl, aryl having 1 to 20 carbon atoms, and $n$ is 1, 2, or 3 and wherein the molar ratio of the compound R$_n$AlX$_{3-n}$ to TiCl$_3$·⅓AlCl$_3$ is in the range of 0.5:1 to 10:1 and the molar ratios of PX$_3$ and X$_2$ to TiCl$_3$·⅓AlCl$_3$ are in the range of 0.01:1 to 7.5:1.

7. A process according to claim 6 wherein the molar ratio of the compound R$_n$AlX$_{3-n}$ to TiCl$_3$·⅓AlCl$_3$ is in the range of 1:1 to 7.5:1 and the molar ratios of PX$_3$ and X$_2$ to TiCl$_3$·⅓AlCl$_3$ are in the range of 0.05:1 to 5:1.

8. A process according to claim 6 wherein the catalyst is formed by mixing together the compounds of the formula R$_n$AlX$_{3-n}$, PX$_3$ and X$_2$ and thereafter adding same to the compound of the formula TiCl$_3$·⅓AlCl$_3$.

9. A process according to claim 6 for the polymerization of propylene wherein the polymerization is carried out at a temperature in the range of 80° to 250° F.

References Cited

UNITED STATES PATENTS

| | | | |
|---|---|---|---|
| 2,959,576 | 11/1960 | Payne | 260—94.9 |
| 3,004,020 | 10/1961 | Young et al. | 260—94.9 |
| 3,091,607 | 5/1963 | Raum | 260—94.9 |

JOSEPH L. SCHOFER, *Primary Examiner.*

M. B. KURTZMAN, *Assistant Examiner.*

U.S. Cl. X.R.

252—429; 260—94.9